Figure 11:
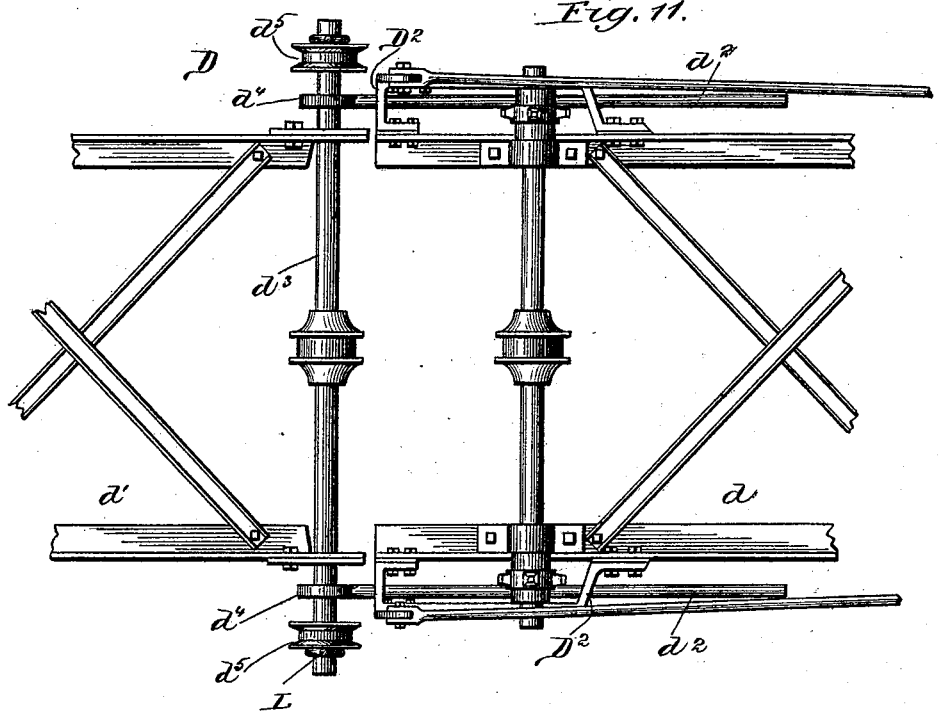

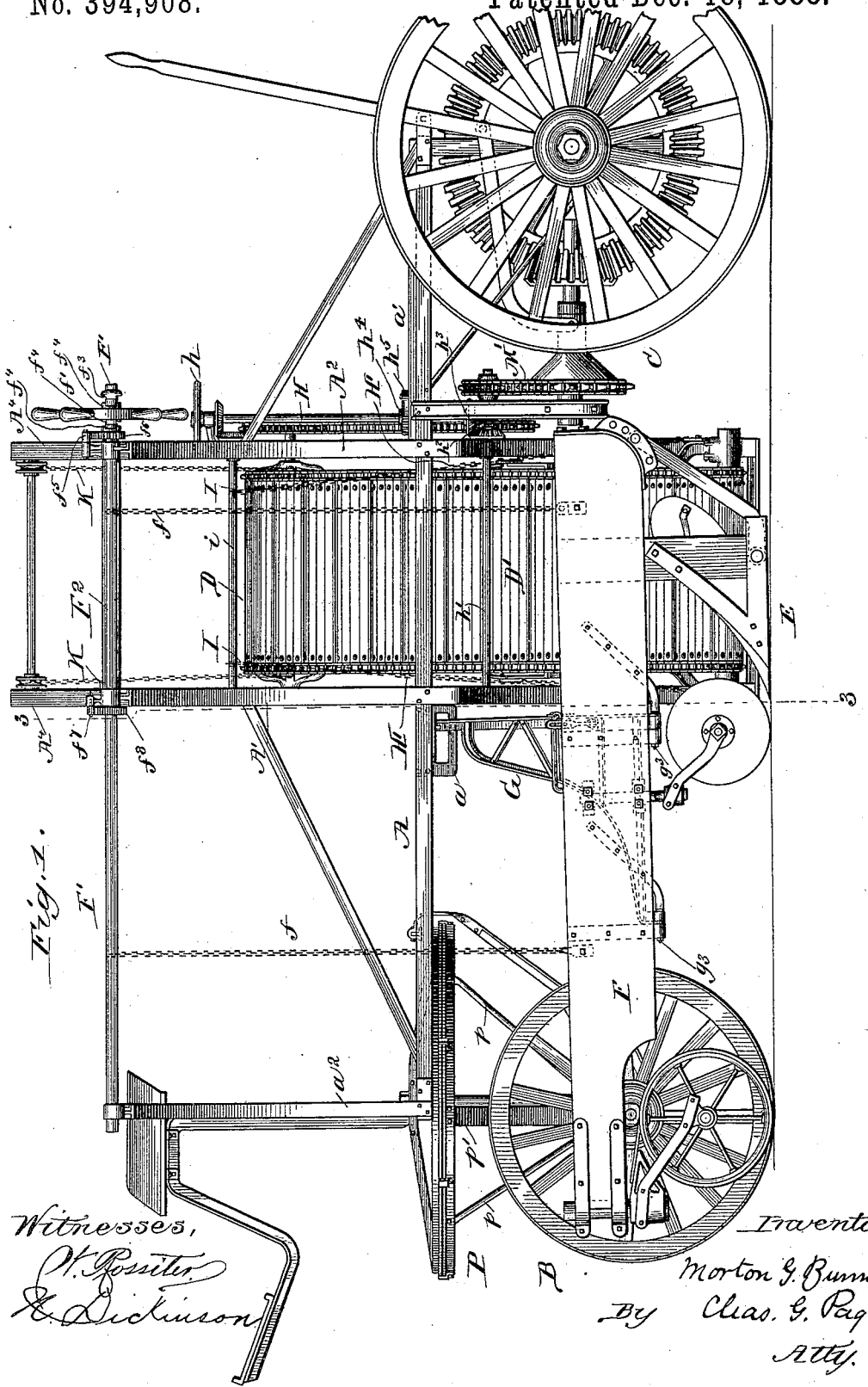

(No Model.) 6 Sheets—Sheet 2.
M. G. BUNNELL.
GRADING AND DITCHING MACHINE.
No. 394,908. Patented Dec. 18, 1888.
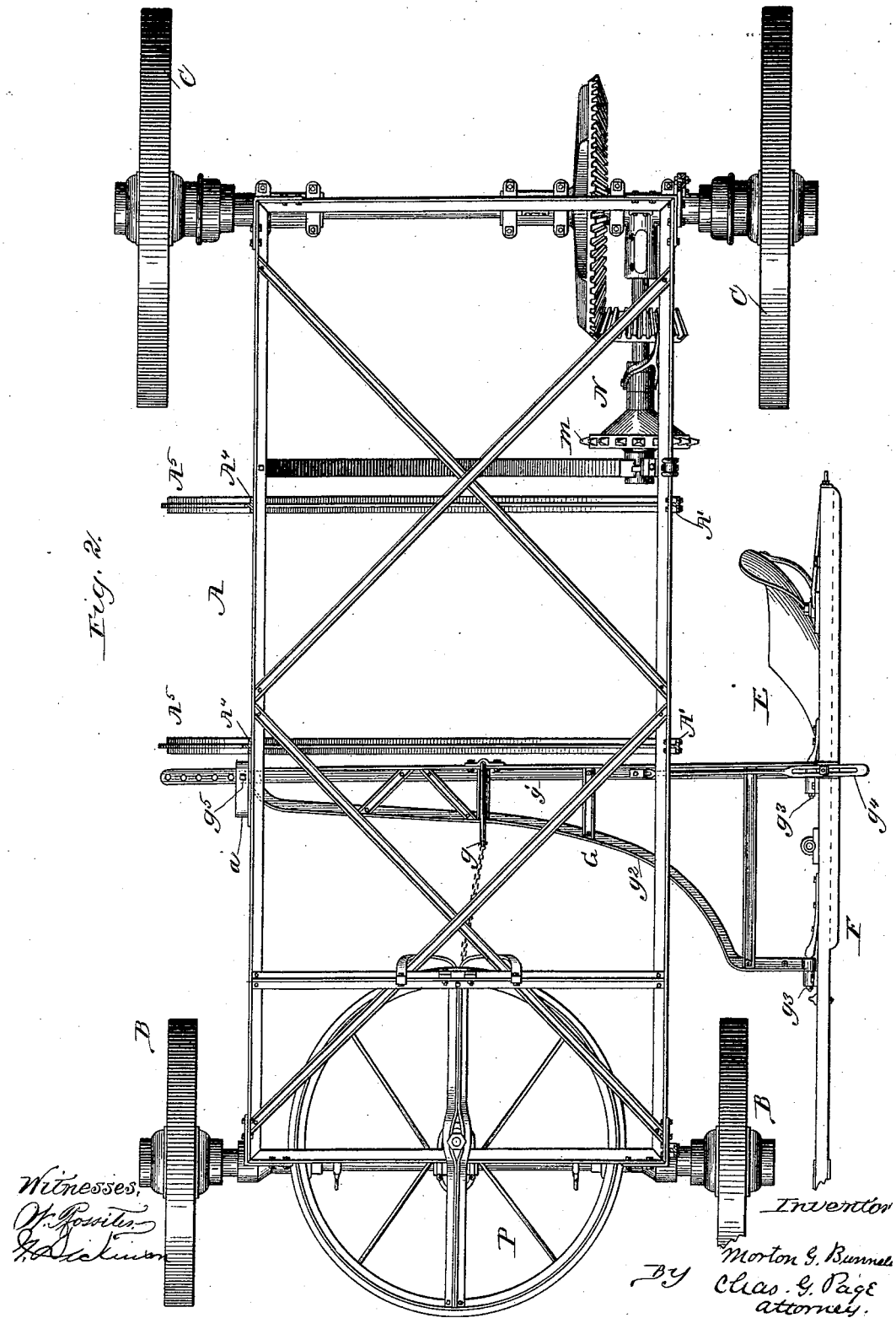

(No Model.) 6 Sheets—Sheet 3.
M. G. BUNNELL.
GRADING AND DITCHING MACHINE.
No. 394,908. Patented Dec. 18, 1888.
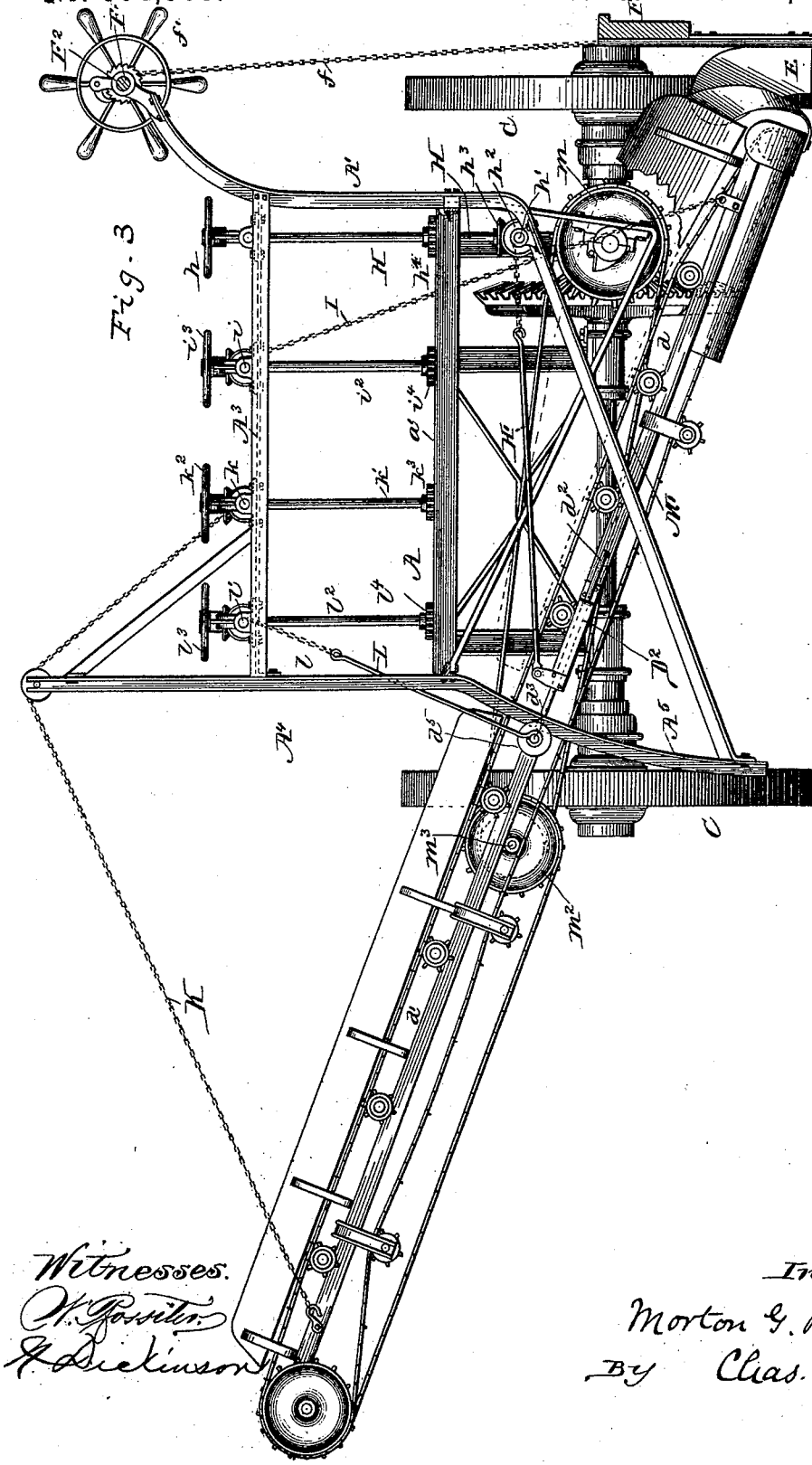
Witnesses.
W. Rossiter
F. Dickinson
Inventor
Morton G. Bunnell
By Chas. G. Page
Atty.

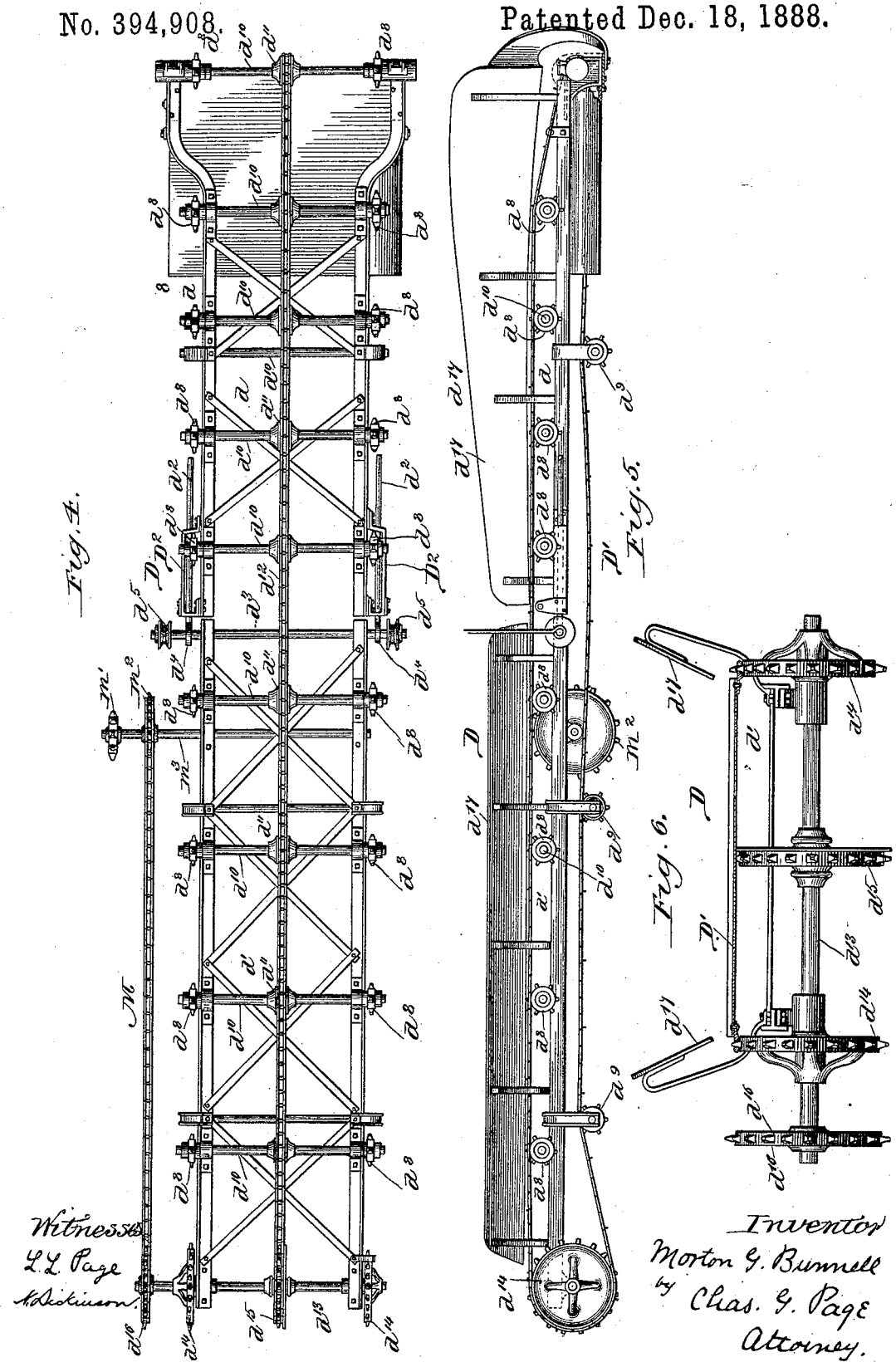

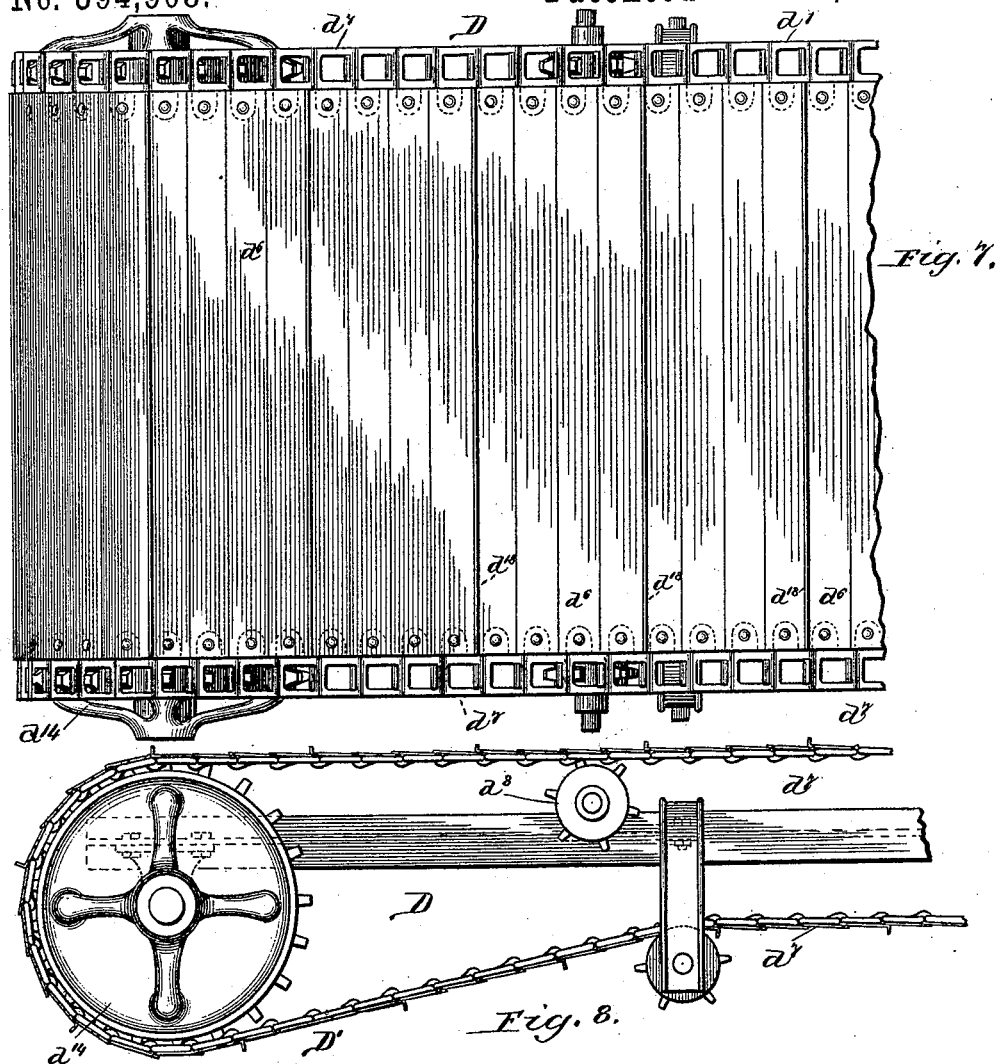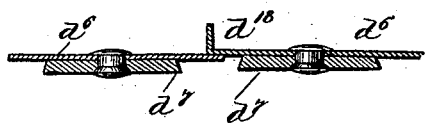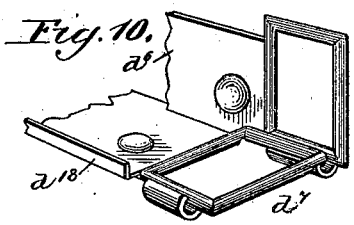

(No Model.) 6 Sheets—Sheet 6.
M. G. BUNNELL.
GRADING AND DITCHING MACHINE.

No. 394,908. Patented Dec. 18, 1888.

Witnesses.
L. L. Page
W. Dickinson

Inventor
Morton G. Bunnell
by Chas. G. Page
Attorney.

UNITED STATES PATENT OFFICE.

MORTON G. BUNNELL, OF CHICAGO, ILLINOIS, ASSIGNOR TO FREDERICK C. AUSTIN, OF SAME PLACE.

GRADING AND DITCHING MACHINE.

SPECIFICATION forming part of Letters Patent No. 394,908, dated December 18, 1888.

Application filed June 11, 1888. Serial No. 276,743. (No model.)

*To all whom it may concern:*

Be it known that I, MORTON G. BUNNELL, a citizen of the United States, residing at Chicago, in the county of Cook and State of Illinois, have invented a new and useful Improvement in Grading and Ditching Machines, of which the following is a specification.

Prior to my invention a certain construction of grading and ditching machine has involved a plow-beam suspended by raising and lowering chains and controlled by a couple of bars arranged laterally to the plow-beam and respectively connected with the forward and rear ends of the plow-beam, the forwardly-arranged one of said bars being in such case employed as a draft-bar, and to such end it has been connected with the forward axle by a draft-chain.

An object of my invention is to entirely dispense with the guide and controlling bar heretofore connected with the plow-beam in rear of the plow and to efficiently guide and control the plow-beam by a single bar, whereby the machine can be shortened up and at the same time ample space afforded in rear of the elevator for a drive-chain extending under and transversely to the body-frame of the machine and employed in a power-transmitter which takes the driving-power from the rear axle at a point near the rear wheel, which is at the plow side of the machine, it being also observed in this connection that by the employment of a single bar arranged as hereinbefore set forth the construction is greatly simplified and lightened, and at the same time the plow permitted to line itself and freely dodge obstructions. To the attainment of the foregoing ends I provide in connection with the suspended plow-beam a combined draft and balance bar which is at one end pivotally supported and at its opposite end hinged to the plow-beam at a point intermediate of the ends of the latter and sufficiently near the plow to serve as a balancing-bar as well as a draft-bar in contradistinction to the forwardly-arranged draft-bar heretofore employed in connection with a rearwardly-arranged controlling-bar, and also in contradistinction to a lever attached to the tongue and at one end connected with the forward end of the plow-beam.

Further objects of my invention are to provide a simplified and efficient construction of raising and lowering device for operating the chains by which the plow-beam is suspended; to provide means whereby the conveyer-belt of the elevator can be tightened or loosened by an attendant standing upon the machine; to provide improved means whereby an attendant standing upon the machine may raise and lower the elevator at its middle jointed portion; to avoid end-thrust of the elevator in raising or lowering the elevator as a whole; to provide certain improvements in the construction of the elevator and its conveyer-belt, and to further provide certain improved details of construction serving to increase the general efficiency of the machine.

Figure 12:
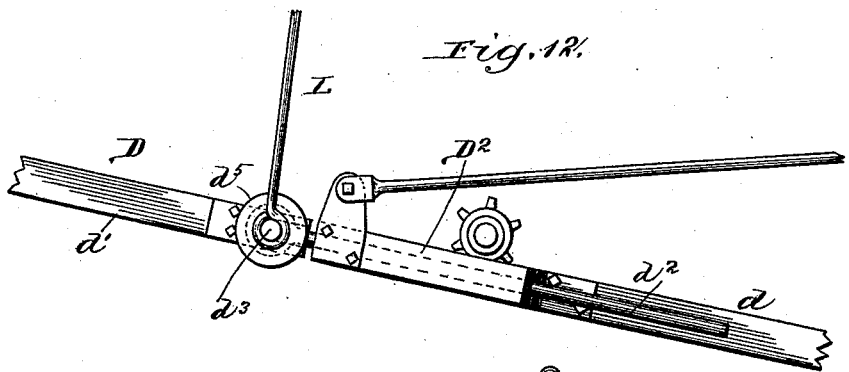
Figure 13:
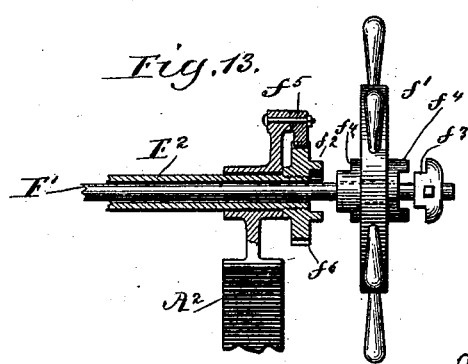

In the drawings, Figure 1 represents in side elevation a grading and ditching machine embodying my invention. Fig. 2 is a top plan view of the wheeled body-frame and principal matters below the same, with the exception of the elevator and chains for driving the conveyer-belt, which are omitted, it being observed that the parts above the body-frame are removed by taking a section through the machine on a horizontal plane parallel with and just above the plane of the body-frame A. Fig. 3 represents a section taken transversely through Fig. 1 on the line 3 3, and looking toward the rear of the machine. Fig. 4 is a top plan view of the elevator, or "elevating-conveyer," as it may be indifferently termed, with the conveyer-belt and one of the drive-chains omitted. Fig. 5 is a side view of the same. Fig. 6 is an end view showing the delivery end of the elevator with the upper fold or leaf of the conveyer-belt in transverse section. Fig. 7 is a top plan view, on a somewhat larger scale, of the delivery-end portion of the elevator. Fig. 8 is a side view of the portion of the elevator shown in Fig. 7. Fig. 9 is a detail representing, on a still larger scale, a section taken through a couple of the conveyer-belt slats at the points where they are riveted to the links $d^5$. Fig. 10 represents in perspective a couple of the links and end portions of two of the slats secured thereto, said view being made to show the way in which the links can be disconnected from one another. Fig. 11 represents in top plan view the middle jointed portion of the frame of the elevator and illustrates the belt-tightener and construction of joint. Fig. 12 represents in side elevation the portion of the elevator shown in Fig. 11. Fig. 13 is a detail representing in longitudinal section the rear end portion of the hollow winding-shaft $F^2$, the bearing therefor, and the pawl and ratchet by which it may be locked, and in elevation the rear end portion of the winding rod or shaft F' and the hand-wheel thereon.

In said drawings, A denotes the body-frame, B the front wheels, and C the rear wheels, of the grading and ditching machine.

The elevating-conveyer D, which is arranged transversely to the length of the machine, is extended both under the body-frame and out from one side thereof, so that soil delivered to the conveyer-belt D' from a plow, E, arranged at one side of the machine and having a side delivery, can be carried by the belt to one side of the machine and there discharged either onto the road or into a wagon, as may be desired.

The plow is suitably attached to the plow-beam F, which latter is suspended alongside the machine, so as to bring the plow into position for delivering the soil onto the conveyer-belt. The plow-beam is suspended by raising or lowering chains $f$, so that it can be either adjusted in height to vary the depth of the furrow or raised to an extent to permit the plow to clear the ground.

The plow-beam is guided and controlled in its various movements by a combined draft and balance bar, G, which is at one end flexibly attached to the plow-beam and at its opposite end pivoted upon the body-frame, so that it may swing horizontally and also rise and fall to a suitable extent at its end that is connected to the plow-beam. This combination draft and balance bar is arranged substantially opposite a point midway the length of the plow-beam, or at a point in front of but so near the plow that the presence of auxiliary controlling bars or attachments connected with the plow-beam in the rear of the plow are rendered unnecessary.

The end of the draft and balance bar that is attached to the plow-beam is widened in any suitable way, so that the connection between said bar and the plow-beam can in effect be made along a considerable length of the plow-beam, the extended bearing thus afforded serving to steady the plow-beam, although permitting it to partake of the horizontal swing of the bar. The combination draft and balance bar G is connected with the forward axle-bar through the medium of a link or draft-chain, $g$, which can be adjusted in length in any suitable mechanical way in order that the plow may operate either farther forward or farther to the rear with reference to the elevating-conveyer, it being understood that for some soils the plow should be set farther forward and for others it should be set farther to the rear.

So far as the principle of operation is concerned the construction of this single combined draft and balance bar is not material; but as a preferred construction, involving what I regard as merit in detail, said bar is herein shown formed of a couple of rails or angle-irons, $g'$ and $g^2$, one diverging from the other in the direction of the plow-beam and both suitably connected together by cross-braces, in which way the combined draft and balance bar is widened at one end in an efficient manner without unnecessarily weighting it down, and in a way to adapt it to withstand the great strain to which it may be subjected in plowing.

The combined draft and balance bar is connected with the plow-beam by horizontally-arranged pivots $g^3$, Figs. 1 and 2, which allow a lateral tilt of the plow-beam in order that the plow may be tilted to one side for cutting sod. As a means for preventing such tilt of the plow and securing it either in its tilted or upright position, as may be required, a rod, $g^4$, is at one end hinged to the combined draft and balance bar and at its opposite end adjustably connected with the top edge of the plow-beam in any suitable way. As herein shown, the rod is slotted to receive a bolt that is secured in the plow-beam and provided with a tightening-nut; but other mechanical expedients for attaining an adjustable connection between the rod and the plow-beam may be provided.

The draft and balance bar G may be adjusted longitudinally in order to vary the distance between the plow and the elevator, and for such purpose said bar is provided along its end portion which rests in a bearing, $a$, on the body-frame with a line of perforations, Fig. 2, for the removable pivot $g^5$, which can be transferred from one perforation to another, according to the end adjustment of the bar. The horizontal swing of the bar G permits the plow to fall back during operation to such extent as the length of draft-chain $g$ may allow the bar to swing back. The latitude of vertical swing on the part of bar G to adapt it to such adjustment in height of the plow-beam as may be made by operating the raising and lowering chains $f$ can be attained by simply making the perforations for the pivot-bolt $g^5$ of sufficient size to admit of such movement on the part of said bar G.

The two chains $f$, for raising and lowering the plow-beam and plow, are attached at their lower ends to the plow-beam respectively in advance and to the rear of the plow. The raising and lowering chain, which is thus attached to the plow-beam at a point in advance of the plow, is at its upper end attached to a rotary winding-shaft, F', which is arranged horizontally over the plow-beam, as best shown in Fig. 1. The winding-shaft F' is at its forward end supported by a standard, $a^2$, which rises from the main frame A, while at its rear end portion said winding-shaft extends through and is supported by a rotary sleeve or hollow winding-shaft, $F^2$, to which latter is attached the raising and lowering chain that is connected with the plow-beam in rear of the plow. The hollow winding-shaft $F^2$ is mounted in bearings on the standards $A'$ and $A^2$, and is at its rear end provided with a clutch-gland, $f^2$, as best shown in Fig. 13; and upon the rear end of the winding-shaft $F'$, which extends back from said end of the hollow shaft $F^2$, is secured a similar clutch-gland, $f^3$.

The hand-wheel $f'$ is provided with two oppositely-arranged clutch-glands, $f^4$, and is loosely mounted upon the winding-shaft $F'$ at a point between the clutch-gland $f^3$ of said shaft $F'$ and the clutch-gland $f^2$ of the hollow shaft $F^2$, in which way the hand-wheel can be shifted along the shaft $F'$, so as to throw it into clutch either with the clutch-gland $f^2$ or the clutch-gland $f^3$. When, therefore, it is desired to raise or lower the forward end of the plow-beam, an attendant, standing upon the platform $a'$ on the body-frame of the machine, can shift the hand-wheel so as to place it in engagement with the clutch-gland $f^3$, that is fixed upon the rear end of the long winding rod or shaft $F'$, whereby he may operate said shaft, while on the other hand, when it is desired to raise or lower the rear end of the plow-beam, the attendant can shift the hand-wheel so as to place it in engagement with the clutch-gland $f^2$, that is fixed on the rear end of the hollow winding-shaft $F^2$, whereby he may operate the hollow winding-shaft $F^2$ without operating the long winding-shaft $F'$.

The two winding-shafts $F'$ and $F^2$ can be temporarily locked against rotation in a direction to let down the plow-beam by any suitable means—as, for instance, a pawl, $f^5$, Fig. 13, can be hung upon one of the bearings for the hollow winding-shaft and arranged to engage a ratchet, $f^6$, that is fixed on the hollow winding-shaft, and in like manner a pawl, $f^7$, Fig. 1, can be hung upon another of the bearings for the hollow winding-shaft and arranged to engage a ratchet, $f^8$, fixed upon the long winding-shaft $F'$.

In connection with the foregoing matters any suitable construction of elevating-conveyer may be employed; but, as a matter of further improvement in a grading and ditching machine, the elevator herein shown involves certain features which I may now set forth.

The elevating-conveyer comprises a sectional frame, which is herein shown divided into two sections, the section $d$ being suspended under the body-frame and the section $d'$ being extended out from one side of the said body-frame. These two sections of the elevating-conveyer frame are coupled together by a sliding connection, so as to provide in effect an extensible frame which can be varied in length for the purpose of tightening or loosening the endless conveyer-belt $D'$. In connection with said extensible elevating-conveyer frame I provide suitable means whereby an adjustment in its length can be readily attained by an attendant upon the machine, it being desirable that the belt should be tightened up for conveying heavy soil, while for light work the belt may be somewhat loosened up, and hence avoid an unnecessary expenditure of power.

In the elevating-conveyer herein shown (see particularly Figs. 11 and 12) the extensible connection between the two frame-sections is attained by rods $d^2$, attached to one frame-section and arranged to extend through bearings $D^2$ on the other section, in which way, by any suitable arrangement of levers or like devices, one of the frame-sections can be shifted away from or toward the other section; or, if desired, both frame-sections could obviously be shifted, since the result in each case would be to either lengthen or shorten the sectional frame, and hence tighten up or loosen the belt, it being understood that whether either or both sections of the elevator-frame be shifted the principle of construction and result involved is that of an elevator provided at opposite ends with rolls for the elevating conveyer or belt, and involving a sliding connection between a support for one roll, which may be the driving-roll, and a support for the other roll, which will be an idler, whereby by a relative adjustment between said two roll-supports the tension of the endless conveyer or belt can be adjusted. It is, however, desirable to provide a hinge-connection between the two frame-sections, in order that the delivery end of section $d'$ may be raised and lowered with reference to the height the belt $D'$ should discharge from, and also that said section may be raised and brought into a substantially vertical position during travel without working. To such end the slide-rods $d^2$ are adapted to provide hinge-pintles, and hence, while having a sliding connection with the frame-section $d$, have a pivotal connection with the next adjacent frame-section, which latter can be provided with a cross-rod, $d^3$, arranged to provide pivots or journals for eyes $d^4$ of the said pintle-rods $d^2$. By such arrangement the frame-section that is below the body-frame can by any suitable means be shifted endwise, either away from or toward the upper section, $d'$, which latter should in such case be held against longitudinal movement, but be permitted to tilt.

As one of various ways in which the lower elevating-conveyer frame-section may be shifted in a direction to tighten the belt, the machine is provided with an upright rotary shaft, H, Fig. 3, which may be connected with the frame-section $d$ through the medium of any suitable power-transmitting connection and provided with a hand-wheel, $h$, that is arranged within convenient reach of an attendant standing upon the platform $a'$, in which way a suitable belt-tightener involving a winding device can be subject to the control of an attendant on the machine, whereby he can at will and without delay adjust the distance between the driving-roll at one end of the elevator and the idler-roll at the opposite end of the elevator without getting off the machine and while the machine is in operation.

As one of an obvious variety of power-transmitting connections between the section-frame $d$ and the shaft H, the latter is at its lower end connected by gears $h^2$ and $h^3$ to a horizontally-arranged rotary shaft, $h'$, Figs. 1 and 3, which said shaft $h'$ is in turn connected to the frame-section $d$ through the medium of a chain-and-link connection, H′. In this way the hand-wheel $h$ can be turned to cause the section H′ to exert a pull upon the lower frame-section of the elevating-conveyer in a direction to shift it away from the upper frame-section, $d'$, and hence separate the belt-rolls or belt-sprockets which are at the extreme ends of the elevating-conveyer to an extent to tighten up the belt, which will of course automatically loosen up when the said hand-wheel is turned or permitted to turn in a contrary direction. As a matter of course, the frame-section $d$ could be positively shifted in each direction by appropriate mechanism—such, for example, as by a crank-and-pitman connection; but the foregoing device will be found to answer all practical purposes.

In this connection it may be noted that the lower ends of the standards A′ and A² are desirably extended under the body-frame of the machine, as illustrated by the arrangement of the standard A′ in Fig. 3, and that in such case the lower inclined end portions of said standards can be utilized to support the shaft $h'$. The elevating-conveyer is at its receiving end suspended from a rotary winding-shaft, $i$, through the medium of chains I, one of which is best represented in Fig. 3, while at its delivery end said elevating-conveyer is suspended from a similar winding-shaft through the medium of chains K, of which one is illustrated in said figure.

The winding-shaft $i$ for the chains I is represented in Fig. 1, while the winding-shaft $k$ for the chains K is simply shown in end view in Fig. 3. These two winding-shafts, however, have a like arrangement, and are consequently mounted in bearings on elevated cross-bars A³, which serve to connect the vertical bars or standards A′ and A² at one side of the machine with vertical bars or standards A⁴ at the opposite side of the machine, as in Fig. 3, wherein one of said cross-bars A³ is illustrated. The bars or standards A⁴ rise to a proper height and are provided at their upper ends with pulleys for the chains K, so that when so desired the frame-section $d'$ of the elevating-conveyer can be raised to a vertical position by properly winding the chains K upon their allotted winding-shaft.

In place of applying hand-wheels directly to the winding-shafts $i$ and $k$, I prefer to operate them in the way the rotary shaft $h'$ is herein worked, and to such end I gear-connect with the winding-shaft $i$ a rotary vertically-arranged shaft, $i^2$, carrying a hand-wheel, $i^3$, and in like manner gear-connect with the winding-shaft $k$ a rotary vertically-arranged shaft, $k'$, that is provided with a hand-wheel, $k^2$.

Certain features herein shown in the construction of the elevator are claimed in application No. 271,724 for Letters Patent of the United States executed jointly by James C. Bennett and myself for a joint invention, it being understood that said matters may be employed in the machine herein set forth, and particularly when, as hereinbefore set forth, an ordinary endless belt is used for the slotted belt.

The vertical shaft H can be provided with a ratchet, $h^4$, arranged about on a level with the platform $a'$, and in like manner the shaft $i^2$ can be provided with a ratchet, $i^4$, and the shaft K′ with a ratchet, K³. It is understood that suitable pawls are provided for those several ratchets, (for example, as in Fig. 1, wherein a pawl, $h^5$, for the ratchet $h^4$, is shown,) in which way the pawls can be conveniently actuated by the foot of an attendant standing upon the platform, thereby leaving his hands free to manipulate the hand-wheels.

It is desirable that when the elevating-conveyer is adjusted in height at either end a corresponding adjustment in height should be made at the joint between its two frame-sections, in order to straighten the sectional frame as a whole, and hence insure the proper working of the belt. To such end the sectional frame is at its jointed portion provided with rollers $d^5$, arranged to run along upright tracks or guides A⁵, which depend from the body-frame of the machine, and at said portion of the elevating-conveyer a raising and lowering device is connected therewith.

The cross-rod $d^3$ affords journals for the rollers $d^5$, and the upright bars A⁴ are conveniently extended below the body-frame, so as to provide the guides A⁵, as indicated in Fig. 2. As a raising and lowering device for the aforesaid middle or jointed portion of the elevator, links L are attached to the rod $d^3$, as in Figs. 3 and 12, and connected by chains $l$ with a winding-shaft, $l'$, which is shown in end view in Fig. 3, and which, like its companion winding-shafts, is mounted upon the cross-bars A³ and gear-connected with a vertically-arranged actuating-shaft, $l^2$. Said shaft $l^2$ is at its upper end provided with a hand-wheel, $l^3$, which will be within convenient reach of the attendant, while at its lower end the shaft is provided with a ratchet, $l^4$, for a pawl that will be within reach of the attendant's foot.

In order to avoid undesirable end-thrust of the frame of the elevating-conveyer when it is adjusted in height by the raising and lowering device last described, each track or guide A⁵ is formed on the arc of a circle having as its center the receiving end of the elevating-conveyer, in which way the elevating-conveyer can be raised or lowered without either thrusting its receiving end into the plow or undesirably varying the required distance between the two. The inclination of the elevating-conveyer serves to maintain the rollers $d^5$ against the curved guides $A^5$, and in this connection it will be seen that when the lower frame-section, $d$, is shifted endwise in a direction to tighten the belt the guides $A^5$ serve as stops or abutments which hold the upper frame-section, $d'$, against partaking of such end movement of the lower frame-section.

The extension of the bars $A'$ and $A^2$ below the body-frame affords, in addition to the provision of supports for the winding-shaft $h'$, efficient means for bracing the guides $A^5$ against the weight of the upper portion of the elevating-conveyer, and to such end the lower terminals of said bars are secured to the lower portions of the guides $A^5$.

For the foregoing purposes of my invention no limitation is placed upon the construction of the conveyer-belt and means for operating the same. The conveyer-belt herein shown is composed of a series of metal slats, $d^6$, which are detachably connected together by links $d^7$, so that when it may be desired to vary the length of the belt such end can be readily attained by removing any desired number of slats.

The slats $d^6$ are riveted or otherwise secured to the links, as in Fig. 9, and the links are connected together, so as to provide along each edge of the slatted belt an endless chain or link belt composed of separate links. These two link belts run on sprockets which are arranged at intervals along the elevating-conveyer, it being seen in Figs. 4 and 5 that of these said sprockets $d^8$ serves to uphold the upper leaf of the conveyer-belt, while the lower sprockets, $d^9$, serve to uphold the lower leaf of the same. The sprockets $d^8$ are mounted upon axles $d^{10}$, which also serve to support at their middle a line of sprockets, $d^{11}$, for an endless chain or link belt, $d^{12}$, Fig. 4, arranged by sustaining the slatted conveyer-belt along a line midway of its edges, in which way the slats may be made comparatively thin and light, and at the same time be prevented from sagging under the load they are to sustain.

At the upper delivery end of the elevator is a rotary shaft, $d^{13}$, provided with four chain or sprocket wheels. Of these said chain or sprocket wheels the two wheels $d^{14}$ are fixed upon the shaft and arranged for engaging the link belts that are composed of the links $d^7$, as aforesaid, whereby the slatted conveyer-belt may be driven by properly applying power to the shaft $d^{13}$. The chain or sprocket wheel $d^{15}$ is, however, desirably an idler, and to such end is loosely mounted upon the shaft $d^{13}$, in which way, while the link belt $d^{12}$ serves as a support for and may be operated by frictional contact with the slatted belt, it is not driven by the shaft $d^{13}$.

The chain or sprocket wheel $d^{16}$ is fixed upon the rotary shaft $d^{13}$, and is driven by a chain or link belt, M. Said driving-chain M is driven from the rear wheels, C, in any suitable or desirable way—as, for example, it can be operated from a sprocket, $m$, Fig. 2, which by means of a clutch, N, can be connected with or disconnected with the driving-gear at will. Where the driving-gear is arranged at the plow side of the machine, as herein shown, the driving-chain between the sprocket $m$ and the sprocket $d^{16}$ will be made in two lengths to permit the power-transmitting connection to adapt itself to the position of the upper frame-section, $d'$, of the elevating-conveyer, and to such end the flexible power-transmitting connection between said two sprockets comprises the chain or link belt M, Fig. 4, and a chain or link belt, M', Figs. 1 and 3. The chain M connects with the sprocket $d^{16}$, and the chain M', Fig. 1, connects with the sprocket $m$, and these two chains are respectively connected with sprockets $m'$ and $m^2$, fixed upon a rotary shaft, $m^3$, that is arranged at the joint in the elevating-conveyer, and preferably mounted upon the frame-section $d'$. With further reference to the elevating-conveyer, the side pieces or guards, $d^{17}$, are supported by arms that are attached to the side rails or bars of the sectional frame, and the axles of the lower sprockets, $d^9$, are journaled in hangers that depend from said frame.

In order to prevent any back-slip of the material that is being carried by the slatted belt, the longitudinal edges of some of the slats are turned up, as $d^{18}$, Figs. 7 and 9, in which way the proper carrying of the soil will be insured.

While I do not limit myself to a steel elevating-conveyer, it will be observed that it may be made entirely of metal, and also that, if desired, the body-frame may likewise be made of metal, in which case the arrangement of body-frame A and circle P herein shown will be found exceedingly strong and desirable, since the rectangular body-frame can be made sufficiently strong by the addition of a comparatively few braces, and can be conveniently secured to the upper half of the fifth-wheel or circle, of which the lower half may be supported by a bolster mainly formed of brace-bars P and P'.

What I claim as my invention is—

1. In a grading and ditching machine, the combination, with the draft and balance bar arranged transversely to the line of draft and pivotally supported at one end, of the plow-beam hinge-connected to and balanced upon the free end of said draft and balance bar, to which latter the draft is applied intermediate of its pivotally-supported end and its connection with the plow-beam, the plow-beam being provided with a plow and suspended substantially as hereinbefore set forth, and the connection between the combined draft and balance bar and the plow-beam being adjacent to the plow, with the beam extending forward from said point of connection to balance the beam and plow as a whole upon the end of said bar, substantially as described.

2. In a grading and ditching machine, the combination, with the suspended plow-beam carrying a plow, of the draft and balance bar G, hinged to the plow-beam intermediate of the ends of the latter, and having its end that is hinged to the plow-beam widened, substantially as and for the purpose described.

3. In a grading and ditching machine, the combination, with the suspended plow-beam carrying a plow, of the draft and balance bar, hinged at one end of the plow-beam in advance of the plow, and the bar $g^4$, connecting the plow-beam with the draft and balance bar, and having at one end a hinged connection with one of said members and at its opposite end having an adjustable connection with the remaining member, substantially as described.

4. In a grading and ditching machine, the elevating-conveyer comprising a couple of frame-sections which are hinged together by an extensible joint, substantially as and for the purpose set forth.

5. In a grading and ditching machine, the combination, with an endless conveyer-belt, of a sectional elevating-conveyer frame and rods $d$, having sliding connections with one frame-section, substantially as described.

6. In a grading and ditching machine, the combination, with the extensible elevating-conveyer frame, of an adjusting device placed under the control of an attendant standing upon the machine and adapted for extending the length of the sectional elevating-conveyer frame, substantially as and for the purpose set forth.

7. In a grading and ditching machine, the combination, substantially as hereinbefore set forth, with the endless elevating-conveyer and a couple of belt-rolls therefor, respectively arranged at opposite ends of an elevator, involving a sliding connection between a support for the driving-roll at the upper end of the elevator and the idler-roll at the lower end of said elevator, of a belt-tightener adapted for adjusting the distance between said rolls in order to vary the tension of the elevating-conveyer, and comprising in its connection a suitable cord or chain winding device arranged within reach of an attendant upon the machine, whereby he may at will, and while the machine is in operation, tighten or slacken the endless elevating-conveyer, substantially as and for the purpose set forth.

8. In a grading and ditching machine, the combination, substantially as hereinbefore set forth, with the elevating-conveyer, of the curved guides engaged by the elevating-conveyer intermediate of the ends of the latter, whereby in raising and lowering said elevating-conveyer at the middle end-thrust may be avoided, substantially as and for the purpose set forth.

9. In a grading and ditching machine, the combination, substantially as hereinbefore set forth, with the jointed elevating-conveyer, of the guides attached to the body-frame of the machine and rollers carried by the elevating-conveyer at its joint and engaging said guides, substantially as set forth.

10. In a grading and ditching machine, the combination, substantially as hereinbefore set forth, of the elevating-conveyer, curved guides engaged by the elevating-conveyer, and a raising and lowering device for raising and lowering the elevating-conveyer at its middle portion, for the purpose described.

11. In a grading and ditching machine, the combination, with the jointed elevating-conveyer having an extensible joint, of the guides engaged by rollers that are carried by the elevating-conveyer adjacent to its joint, substantially as set forth.

12. In a grading and ditching machine, the combination, with the plow-beam carrying a plow, of the raising and lowering cords or chains, respectively, for varying the height of the forward and rear ends of the plow-beam, and a chain raising and lowering device constructed with the long winding-shaft extending through a shorter hollow winding-shaft, the two clutch-glands, respectively upon the long winding-shaft and the shorter hollow winding-shaft, and the shifting hand-wheel provided with oppositely-disposed clutch-glands, and arranged between the said clutch-glands of the two winding-shafts, substantially as and for the purpose described.

13. In a grading and ditching machine, the combination, with the endless slatted conveyer-belt, of the chain or link belt passing over chain wheels or sprockets and arranged to support the upper leaf of the slatted belt along a line intermediate of the side edges of the latter, substantially as described.

14. In a grading and ditching machine, the combination, with the suspended elevator, of a set of horizontally-arranged winding-shafts for the cords or chains by which the elevator is suspended, and a corresponding set of vertically-arranged hand-wheel shafts and gear-connected with said winding-shafts, substantially as and for the purpose described.

MORTON G. BUNNELL.

Witnesses:
CHAS. G. PAGE,
N. DICKINSON.